(12) United States Patent
Naske et al.

(10) Patent No.: US 10,134,180 B2
(45) Date of Patent: *Nov. 20, 2018

(54) METHOD FOR PRODUCING AN AUTOSTEREOSCOPIC DISPLAY AND AUTOSTEREOSCOPIC DISPLAY

(71) Applicant: psHolix AG, Basel (CH)

(72) Inventors: Ivo-Henning Naske, Kakenstorf (DE); Sigrid Kamins-Naske, Kakenstorf (DE); Valerie Antonia Naske, Kakenstorf (DE)

(73) Assignee: PSHOLIX AG, Basel (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/078,596

(22) Filed: Mar. 23, 2016

(65) Prior Publication Data

US 2016/0205393 A1   Jul. 14, 2016

Related U.S. Application Data

(63) Continuation of application No. 13/580,924, filed as application No. PCT/DE2011/000188 on Feb. 25, 2011, now Pat. No. 9,324,181.

(30) Foreign Application Priority Data

Feb. 25, 2010  (DE) .................. 10 2010 009 291

(51) Int. Cl.
*H04N 13/305*   (2018.01)
*G06T 15/50*    (2011.01)
(Continued)

(52) U.S. Cl.
CPC ............. *G06T 15/50* (2013.01); *G02B 27/22* (2013.01); *G06T 19/20* (2013.01); *G09G 3/003* (2013.01); *H04N 13/111* (2018.05); *H04N 13/183* (2018.05); *H04N 13/305* (2018.05); *H04N 13/31* (2018.05); *H04N 13/324* (2018.05); *H04N 13/349* (2018.05); *H04N 13/383* (2018.05); *H04N 13/398* (2018.05);
(Continued)

(58) Field of Classification Search
CPC ............. G02B 27/22; H04N 13/0497; H04N 13/0011; H04N 13/007; H04N 13/0404; H04N 13/0409; H04N 13/0422; H04N 13/0445; H04N 13/0484; Y10T 29/49004
USPC ........................................... 359/464
See application file for complete search history.

(56) References Cited

U.S. PATENT DOCUMENTS

| | | | | |
|---|---|---|---|---|
| 5,457,574 A * | 10/1995 | Eichenlaub | ........ | G02B 27/2214 348/E13.028 |
| 7,058,252 B2 * | 6/2006 | Woodgate | .......... | G02B 27/2214 348/E13.029 |

(Continued)

*Primary Examiner* — William R Alexander
*Assistant Examiner* — Grant Gagnon
(74) *Attorney, Agent, or Firm* — Maschoff Brennan

(57) ABSTRACT

Method for producing an autostereoscopic display with an optical element and an image forming unit, characterized by the following method steps: provide an optical element preferably generated on a flat substrate, determine position parameters of the optical element using a sensor unit, particularly an optical sensor unit, and deposit the image forming unit onto the back of the optical element based on the position parameters determined. In addition, an autostereoscopic display produced in this manner is disclosed.

10 Claims, 4 Drawing Sheets

Figure 1:
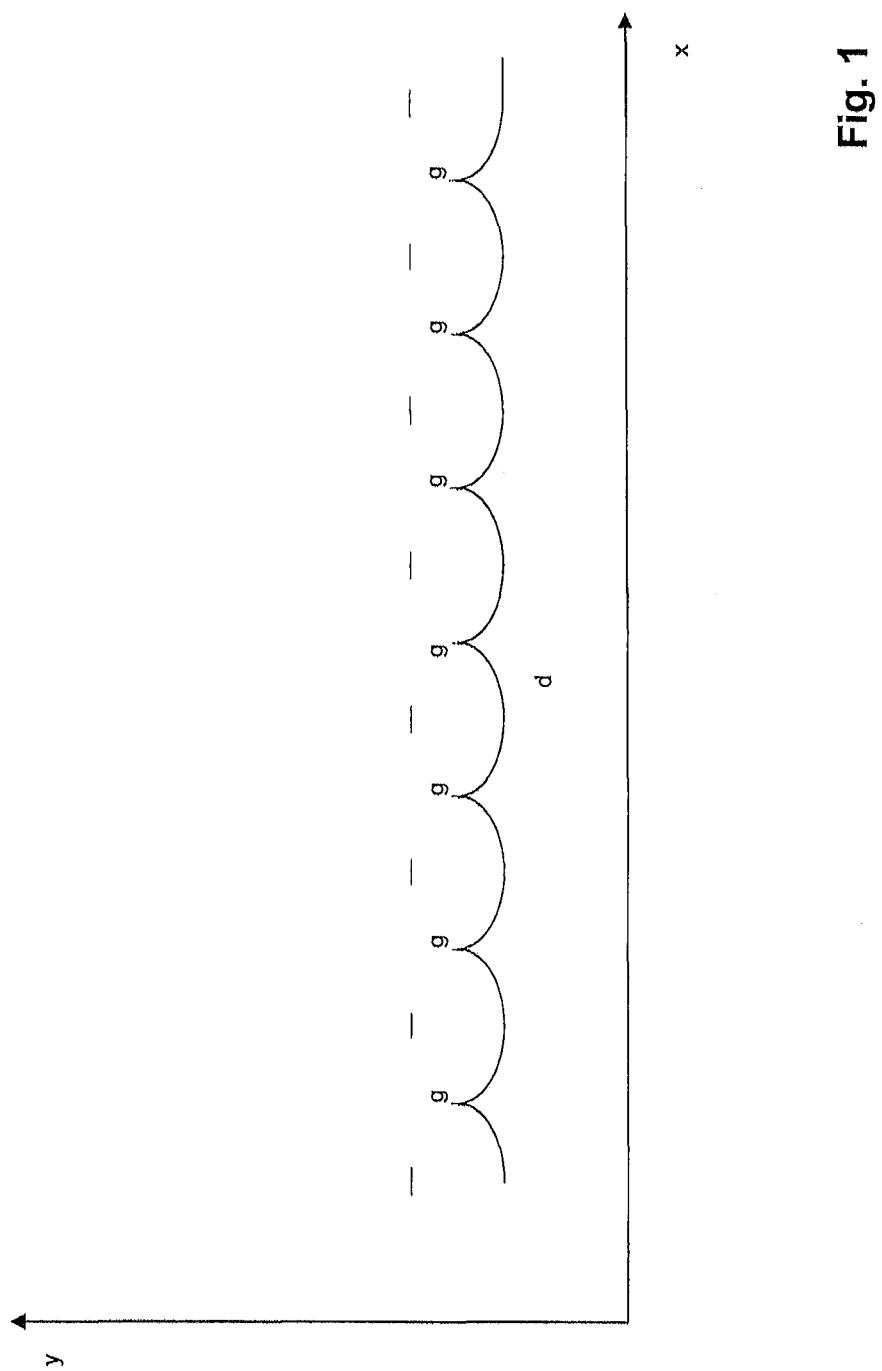

(51) Int. Cl.
    *H04N 13/111*     (2018.01)
    *H04N 13/183*     (2018.01)
    *H04N 13/31*     (2018.01)
    *H04N 13/324*     (2018.01)
    *H04N 13/383*     (2018.01)
    *H04N 13/398*     (2018.01)
    *G02B 27/22*     (2018.01)
    *G06T 19/20*     (2011.01)
    *G09G 3/00*     (2006.01)
    *H04N 13/349*     (2018.01)

(52) U.S. Cl.
    CPC ................ *G06T 2219/2012* (2013.01); *G09G 2300/0452* (2013.01); *Y10T 29/49004* (2015.01)

(56) References Cited

U.S. PATENT DOCUMENTS

| | | | | |
|---|---|---|---|---|
| 8,358,330 B2 * | 1/2013 | Riederer | ................ | G02B 21/22 348/42 |
| 9,324,181 B2 * | 4/2016 | Naske | ................ | H04N 13/0011 |
| 2009/0235542 A1 * | 9/2009 | Miyazaki | ........... | G02B 27/2214 33/286 |
| 2010/0073768 A1 * | 3/2010 | Kim | ................... | G02B 27/2214 359/463 |
| 2010/0182686 A1 * | 7/2010 | Fukushima | ........ | G02B 27/2214 359/463 |
| 2011/0122329 A1 * | 5/2011 | Broughton | ......... | G02B 27/2214 349/15 |
| 2016/0205393 A1 * | 7/2016 | Naske | ................ | H04N 13/0011 348/59 |

* cited by examiner

METHOD FOR PRODUCING AN AUTOSTEREOSCOPIC DISPLAY AND AUTOSTEREOSCOPIC DISPLAY

The invention concerns a method for producing an autostereoscopic display having an optical element and an image forming unit.

The invention also concerns an autostereoscopic display for the visualization of three-dimensional images having an optical element preferably generated on a flat substrate, and an image forming unit.

Autostereoscopic visualization systems are designed to allow one or more viewers located in front of an autostereoscopic display or an autostereoscopic screen to perceive a three-dimensional image without visual aids such as red/blue, shutter or polarization glasses, or similar implements. Parallax barrier systems or lenticular lens systems are attached to the display for this purpose.

There is a wide array of different embodiments of autostereoscopic displays in use. One example is WO 2007/121819 A2. With the known devices, an autostereoscopic display is produced by attaching an autostereoscopic adapter screen onto a conventional 2D display. This adapter screen may be designed to be removable after attachment. Thus in the autostereoscopic display production processes used to-date, a 2D display is first produced as image forming unit, the image forming unit being applied on a substrate and the edge trimmed to obtain the desired display size. An optical element is then placed on this 2D display that generates the different perspectives required for a natural three-dimensional image impression.

With autostereoscopic displays, the positioning of the image forming unit relative to the optical element is of major importance. Positional parameters of 0.001 mm must be strictly adhered to. If for example the image forming unit is not positioned perfectly parallel to the optical element, moiré effects may result when viewing.

This invention thus involves a method for producing an autostereoscopic display of the type described above and optimizing this design for simpler production of an autostereoscopic display that allows higher autostereoscopic display quality. The invention also involves the indication of a corresponding autostereoscopic display.

This invention solves the above by introducing a method for producing an autostereoscopic display with the features per patent claim 1. The invention method thus involves the steps outlined below:

First, an optical element is provided. The optical element is a kind of filter that ensures that only one perspective is sent in a certain direction. The optical element may be generated on a suitable substrate, preferably a flat surface. The substrate material may be glass or acrylic for example, particularly polyethylene terephthalate glycol (PETG).

The position parameters of the optical element are determined by means of a sensor unit, in particular an optical sensor unit. The position parameters determined describe the exact location and characteristics of the optical element.

The image forming unit is deposited on the back of the optical element taking into account the previously determined position parameters. The back of the optical element is the side facing away from the viewer of the autostereoscopic display, and the front side of the optical element is the side facing the viewer. The substrate for the display panel and image forming unit is thus the optical element. This invention achieves greater precision in the assigning of light-emitting elements, in particular of subpixels, to the image forming unit and the optical element. In addition, the number of production steps is reduced, thereby reducing production time. Also, calibration between the image forming unit and the optical element is no longer required.

This invention, a method for producing autostereoscopic displays, thus considerably simplifies the autostereoscopic display production process and enhances autostereoscopic display quality.

It is advantageous to use an optical element as lens structure, particularly a lenticular structure. A lenticular structure is a profile structure consisting of multiple parallel, cylindrical grooves running vertically. This ensures a more well-defined horizontal light distribution. Accordingly, a lenticular structure distributes perspectives for the viewer across multiple zones through the lenticular elements. The human brain can absorb this information and use it to produce a spatial image.

In an alternative advantageous embodiment, a barrier structure can be used as an optical element, in particular a parallax barrier structure. The barrier elements block incorrect views, so the viewer only sees certain perspectives allowing him/her to perceive a spatial image. Opaque or black lines can be printed on a glass substrate, for example, to generate this barrier structure.

The position parameters can be used to calculate control parameters to control deposition of the image forming unit.

A suitable optical sensor unit with a light source and a detection device such as a camera can be used to record the position parameters.

The light source can provide illumination on the front of the optical element in particularly advantageous manner, and on the back of the optical element an image of the transilluminated optical element can be recorded using the detection device. This recorded image allows determination of the position parameters for the optical element. This makes the lens boundaries visible as grooves and the barriers visible as black lines. Simple image processing operations thus allow recording from the captured image the exact position of the lens boundaries and barriers to be recorded in the form of shading or black lines. These can then be used to calculate the control parameters for the process of depositing the image forming unit. Any currently used image operators can be used for image processing. Linear filters like the Sobel operator or morphological operators like dilation and erosion can be used for example. Composite morphological operators can be used as well, such as first a closing and then an opening being performed for noise suppression.

An optical sensor unit with a laser sensor can be used as a sensor unit in a further advantageous embodiment.

The laser sensor can be advantageously used to measure the distance to the surface of the optical element, the distances measured being used to determine the position parameters of the optical element. In specific, the laser sensor measures the distance from the laser sensor to the surface of the optical element. This allows detection of the grooves and barriers through a greater distance to the laser sensor. This information allows calculating the position parameters of the lenses and barrier structure and subsequently can be used in the process of depositing the image forming unit.

In a specific embodiment, an electrical wire frame, particularly an electrical line structure, can be deposited on the back of the optical element. This electrical wire frame can be used to drive the image forming unit and its light-emitting elements.

When depositing the electrical wire frame it is particularly advantageous to use the position parameters of the optical element. This avoids redundant procedural steps.

In an advantageous embodiment, the image forming unit may be comprised of light-emitting elements arranged in a predetermined layout, creating a structure of light-emitting elements on the back of the optical element. The light-emitting elements form the image forming unit, the structure of light-emitting elements corresponding to a subpixel structure. The individual light-emitting elements or subpixels are generated on the back of the optical element based on the prescribed layout, such as RGB or RGBW. The deposition of these subpixels is in turn controlled by the determined position parameters or the control parameters calculated thereupon.

A supplemental electrical wire frame can be deposited on the structure of light-emitting elements to control the light-emitting elements of the image forming unit, deposition being controlled by the calculated control parameters.

The intention outlined above regarding an autostereoscopic display for the visualization of three-dimensional images per the invention is solved by virtue of the features per patent claim 13. The autostereoscopic display for the visualization of three-dimensional images per the invention is characterized by the image forming unit being deposited on the back of the optical element. The same points made apply to a corresponding autostereoscopic display as to the method for the production of an autostereoscopic display per the invention, rendering further explanations beyond those for the method per the invention is unnecessary.

It is advantageous for the image forming unit to have light-emitting elements arranged according to a pre-determinable layout.

It is particularly advantageous for the light-emitting elements to be formed as separate elements. This takes into account that the assignment of the perspectives to be displayed occurs on a subpixel level with autostereoscopic displays. A bundling into pixels is not relevant in such case. The requirement that the subpixels of a pixel together have to form a square is thus eliminated. Each subpixel or light-emitting element of the display is thus a separate element. Each of these subpixels or light-emitting elements has a color from the selected color system and the same horizontal and vertical size. It is advantageous for the light-emitting elements, in particular the individual subpixels, be square in form.

The light-emitting elements of the autostereoscopic display can be the designed to display a color from a pre-determinable color system and/or light/dark information. The light-emitting elements or subpixels can be color subpixels like RGB or CMY or light/dark subpixels. The color information of the subpixels of the perspectives is displayed in the color subpixels. The light/dark subpixels contain image features supporting the 3D impression as gray values, for example. The light/dark subpixels can represent light/dark information, with white or yellow light. This takes account of the fact that the human eye has appr. 110 million light/dark-receptors, and only about 6.5 million color receptors. It is also taken into account the fact that the human brain uses edges of objects to a significant degree to construct the internal three-dimensional spatial image. Thus when light/dark subpixels display edge information, this image information is received in the brain via a much greater number of light/dark receptors. This significantly reduces the work the brain has to perform. The autostereoscopic display is thus better adapted to the anatomy of the eye and subsequent information processing.

A substantial increase in the number of subpixels displayed improves image quality generally. The autostereoscopic display has at least 10 to 20 times as many subpixels as in a received stereo image used for the calculation/synthesis of additional perspectives. This larger number of subpixels makes it possible to represent a greater number of pixels per perspective from the multiple perspectives synthesized. High-definition images and videos of the current generation generally have 1,920×1,080 pixels with 5,760 subpixels per line. Given a tenfold increase and taking into account additional light/dark subpixels that display feature information, an autostereoscopic display has at least 76,800×1,080 subpixels. This takes into account that the assignment of perspectives occurs on a subpixel level with autostereoscopic displays. A bundling into pixels is not relevant in such case. The requirement that all subpixels of a pixel must together form a square is thus eliminated. Instead, each subpixel is an independent element. Each of these subpixels has a color from the selected color system and the same horizontal and vertical size. OLED and Nano-technology used in today's display technology makes this technically feasible without problem.

Figure 2:
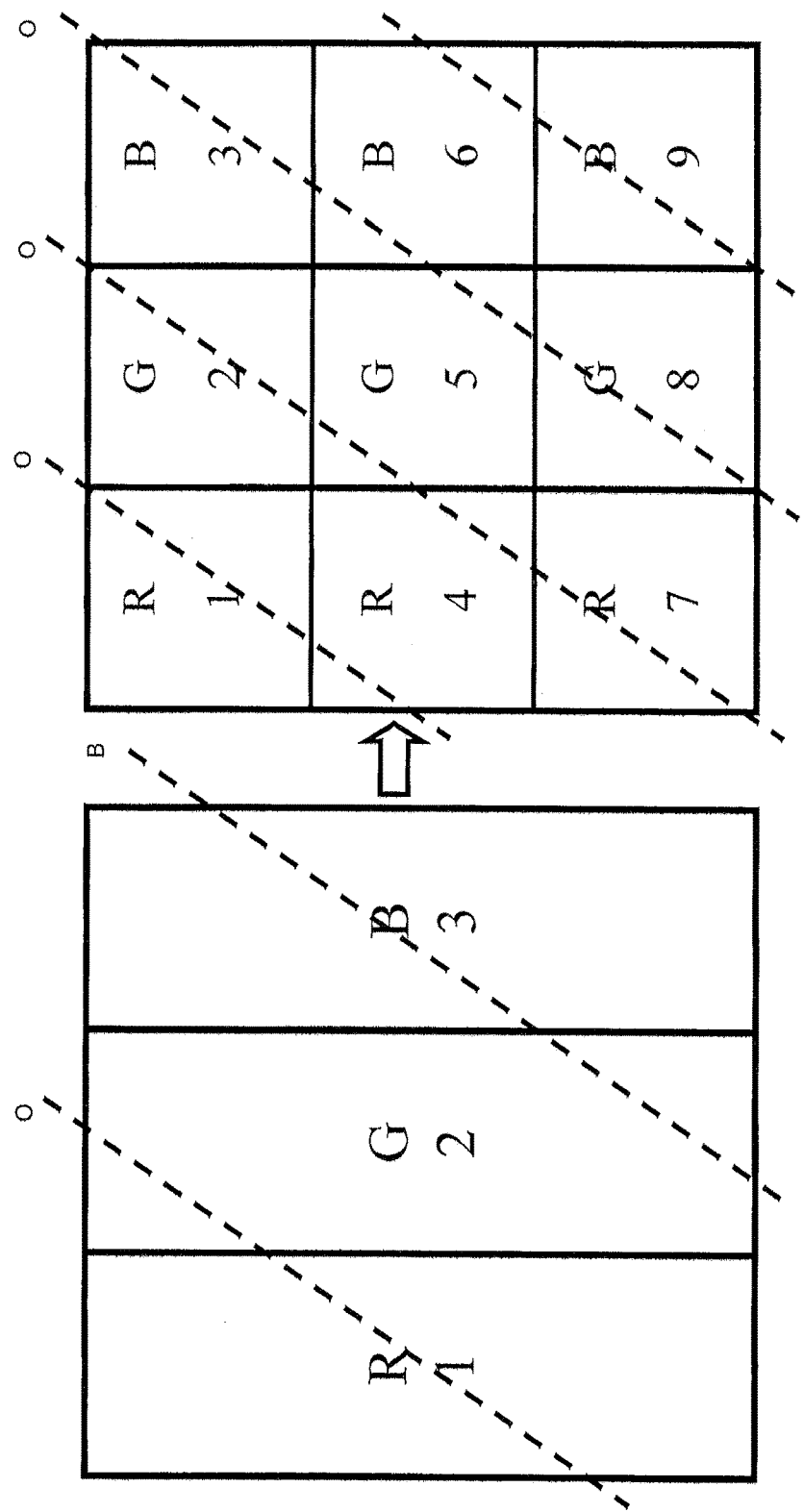
Figure 3:
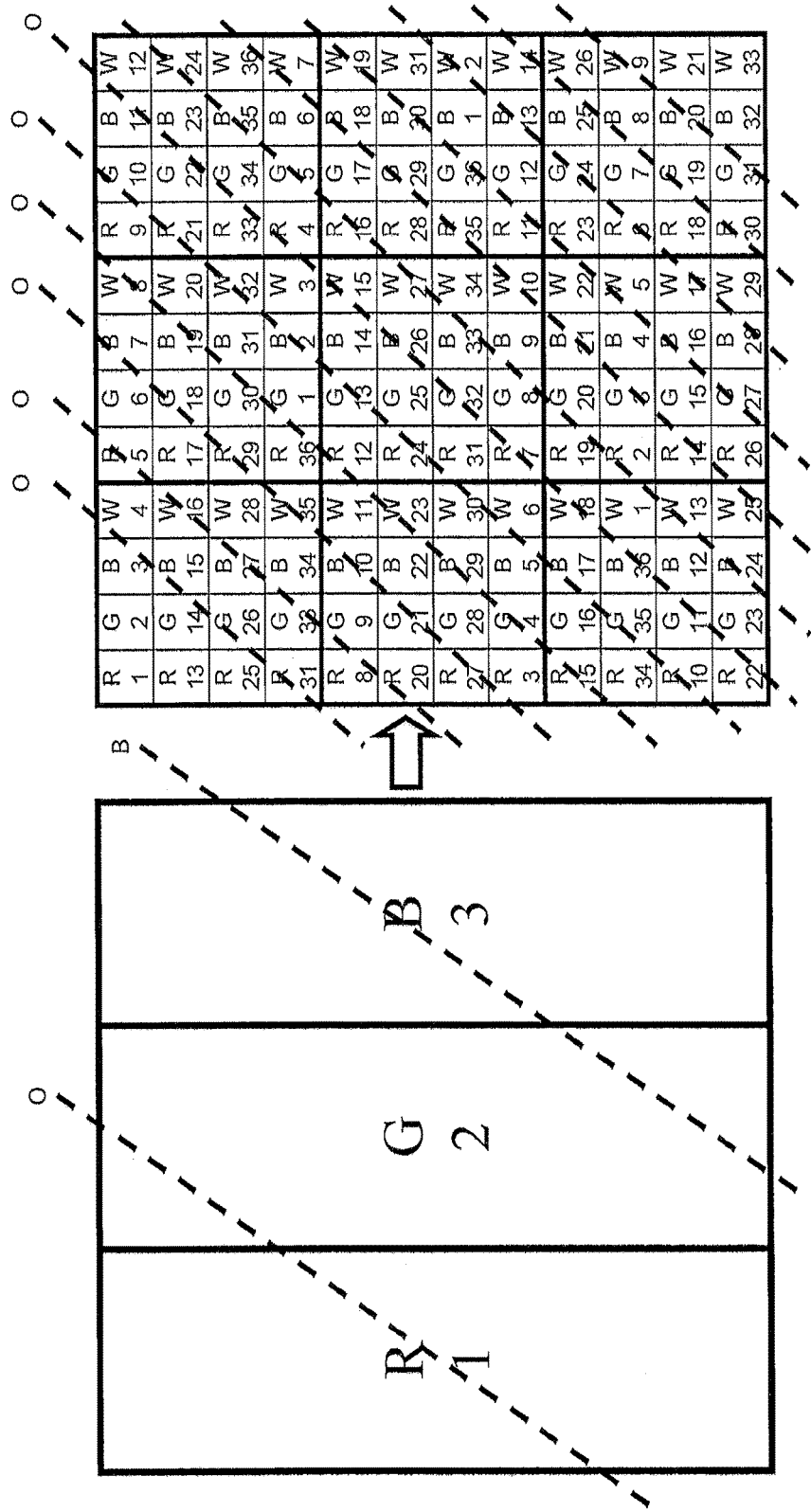
Figure 4:
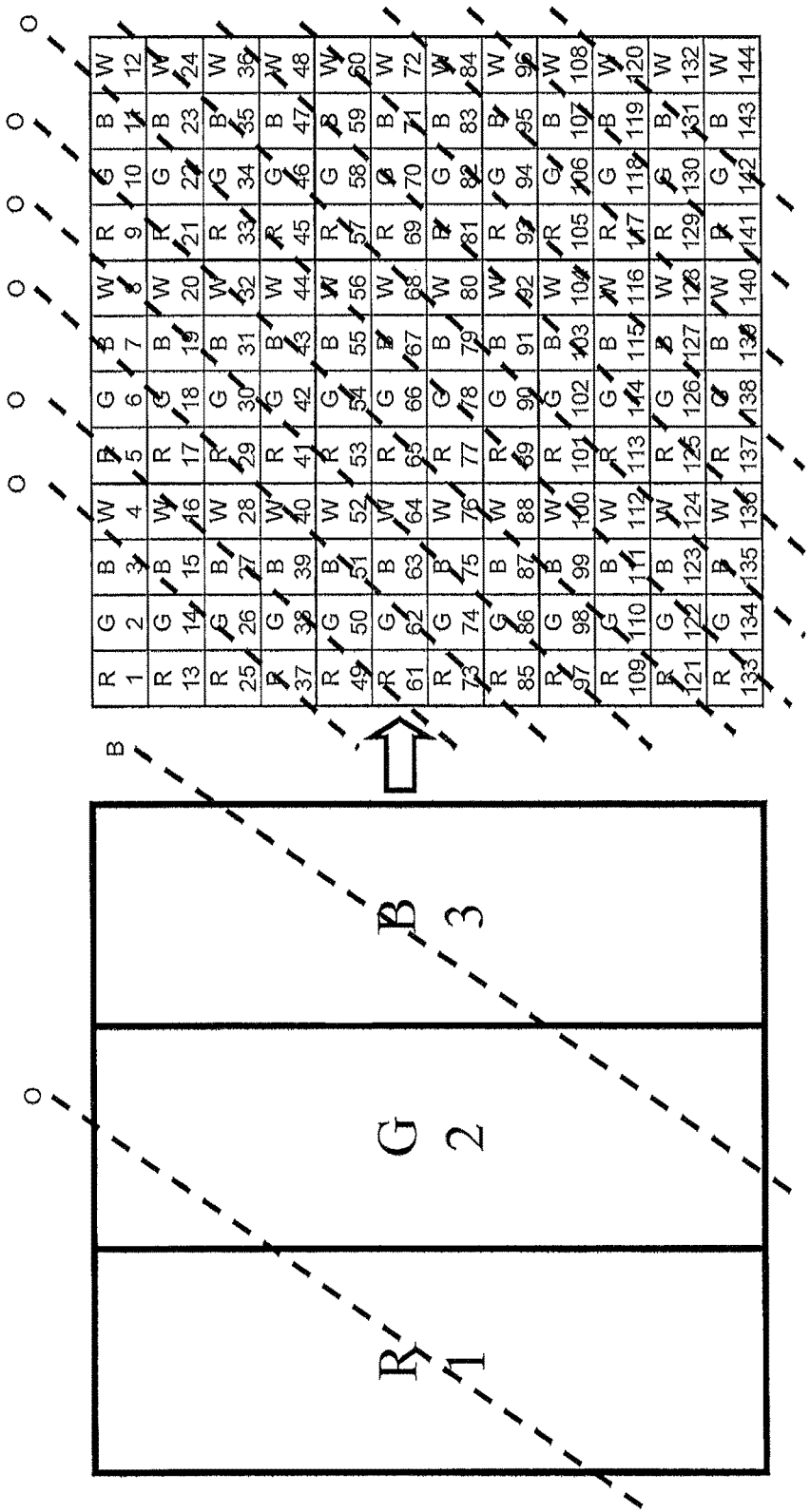

There are now a range of ways to embody and further improve the teaching of prior art through this invention in an advantageous manner. Reference is made accordingly to the sub-claims to claims 1 and 13 and to the description below of a preferred embodiment for the invention as shown in the Figures. Generally preferred embodiments and improvements of the teaching of prior art are outlined in conjunction with the description of the preferred embodiment of the invention per the Figure. In the Figures, FIG. 1 is a diagram of line-by-line laser sensor scanning to detect the position parameters of an optical element in an embodiment of the method per the invention FIG. 2 is a conventional subpixel layout in comparison to a new subpixel layout in an embodiment of an autostereoscopic device per the invention, FIG. 3 is a conventional subpixel layout in comparison to a new subpixel layout in another embodiment of an autostereoscopic display per the invention, and FIG. 4 shows the subpixel layout from FIG. 3, with a larger number of different perspectives being presented.

FIG. 1 is a diagram of line-by-line laser sensor scanning to detect the position parameters of an optical element in an embodiment of the method per the invention. The laser sensor detects the exact position of the optical structure. The x-axis in the diagram represents the position of the laser sensor, while the y-axis represents the measured depth of the measurement object, i.e. the optical element. The measured distances d from the optical element to the laser sensor are also shown in the diagram. The boundaries g of the individual optical elements detected in the measurement process g—of a lenticular structure per FIG. 1—serve as position parameters for the calculation of the control parameters.

Thus in the embodiment depicted in the diagram shown as FIG. 1, a laser sensor measures the distance from the front to the surface of the optical element. The grooves and barriers are detected by a greater distance from the laser sensor. The position parameters of the lenses and barrier structure, i.e. the positions of the boundary structures of the optical element, are determined, and the control parameters used in the deposition process for the image forming unit are calculated based on the position parameters.

In the embodiment the method for the production of an autostereoscopic display is as shown below:
1. First, the optical element is generated on a suitable substrate as a lens structure or barrier structure,
2. An initial electrical wire structure is then deposited on the back of the substrate. The optical sensor unit detects the exact position of the optical element and controls the deposition process for the image forming structure via these position parameters, 3. The color pixels RGB, RGBW or of other layouts are then deposited on the electrical wire structure. This step is likewise controlled by the position parameters previously determined.

4. The final step is depositing the required supplementary electrical wire structure to the subpixel structure now present. This step is also controlled by the position parameters previously detected and the control parameters calculated based on these.

The substrate for the display panel is the optical element itself. This increases accuracy in the assignment of subpixels and the optical element, while reducing the number of production steps, cutting production time accordingly. Also, calibration between the image forming unit and the optical element is no longer required.

In another embodiment, the optical sensor unit is comprised of a light source that illuminates the front of the optical element. A camera on the back of the optical element captures the image of the transilluminated optical element. This makes the lens boundaries visible as grooves and the barriers visible as black lines. Simple image processing operations allow determining the exact position of the lens boundaries and barriers, and calculation of the control parameters for the subpixel deposition process.

FIG. 2 shows a conventional pixel layout on the left with the three subpixels R (red), G (green) and B (blue). These subpixels are fed to the three perspectives 1, 2 and 3 using a lenticular lens as an optical element O. FIG. 2 shows a new subpixel layout on the right in which the independent subpixels form a square in an embodiment of the autostereoscopic display per the invention. Via the optical element O, 9 perspectives can be presented with 9 subpixels.

FIG. 3 shows a conventional pixel layout on the left. On the right, FIG. 3 shows another embodiment of an autostereoscopic display per the invention. A much finer and more detailed substructure is generated utilizing the method per the invention. Instead of three subpixels in a conventional pixel layout, in the subpixel layout of the embodiment, 144 subpixels are generated. The subpixels R (red), G (green) and B (blue) are supplemented by an additional subpixel W (white) to represent light/dark information. These 144 subpixels present the 36 perspectives in the embodiment outlined.

FIG. 4 shows the subpixel layout from FIG. 3 in which the 144 individual, independent subpixels are used to present 144 perspectives. This autostereoscopic display is produced by directly depositing the image forming panel to the back of the optical element O. An optical sensor element detects the exact position of the lenses and barriers. This information is then used to control the deposition process of the image-forming subpixels.

Please refer to the general section of the description and the appended claims regarding further advantageous embodiments of the method and device per the invention.

Explicit advisory is given that the embodiments described above of the device per the invention are provided solely for the purpose of discussing the teaching of prior art employed, and are not constrained to the sample embodiments

The invention claimed is:

1. A method for producing an autostereoscopic display, which is adapted to the anatomy of a human eye, with a plurality of n>2 perspectives for visualization of three-dimensional images for multiple viewers having a 3D impression, said method comprising the steps of:

providing an optical element comprising a flat substrate, which is characterized by a lens structure;

determining position parameters of the optical element using a sensor unit, wherein the position parameters define an exact location for the optical element, and wherein the sensor unit comprises, a light source and a camera detection device and the light source being configured to illuminate the front of the optical element, and an image of the trans-illuminated optical element being captured on the back of the optical element using the camera detection device, and the captured image being utilized to determine the position parameters of the optical element, or wherein the sensor unit comprises a laser sensor, the laser sensor being configured to measure a distance from the laser sensor to the surface of the optical element, and the measured distance being utilized to determine the position parameters of the optical element;

calculating control parameters based on the position parameters of the optical element, wherein the control parameters are utilized to control a generation process for an image forming unit on the surface of the optical element;

creating an image forming unit, which is adapted to the anatomy of the human eye comprising a plurality of light-emitting elements formed as separate elements each having a certain color from a pre-determinable color system or presenting light/dark information on the back of the optical element, and wherein the back of the optical element faces away from the viewer of the autostereoscopic display; and wherein the light/dark information contains grey values display edge information of objects of the three-dimensional images taking into account the control parameters, wherein an electrical wire structure is deposited on the back of the optical element.

2. The method according to claim 1, characterized by a barrier structure being used as an optical element.

3. The method according to claim 1, characterized by using the position parameters of the optical element for depositing the electrical wire structure.

4. The method according to claim 1, wherein the image forming unit comprises a structure of light-emitting elements, and wherein the light-emitting elements comprise undivided subpixels and unbundled pixels.

5. An autostereoscopic display, adapted to the anatomy of a human eye, for the visualization of three-dimensional images, produced by applying a method according to claim 1, the autostereoscopic display comprising:

an optical element generated on a flat substrate; and an image forming unit, wherein the optical element is utilized as a substrate for the image forming unit, the image forming unit being adapted to the anatomy of the human eye, and comprising of light-emitting elements formed as separate elements, each having a certain color from a pre-determined color system, or presenting light and dark information, wherein the light and dark information comprises grey values for displaying edge information of objects in the three-dimensional images, and being generated on the back of the optical element and the back of the optical element facing away from a viewer.

6. The autostereoscopic display according to claim 5, characterized by the image forming unit having light-emitting elements arranged to a pre-determinable layout.

7. The autostereoscopic display according to claim 6, characterized by the light-emitting elements having the same horizontal and vertical size, being in particular square form, the light-emitting elements preferably being used as subpixels.

8. The method according to claim 1, characterized by a parallax barrier structure being used as an optical element.

9. An autostereoscopic display, adapted to the anatomy of a human eye, for the visualization of three-dimensional images, produced by applying a method, the autostereoscopic display comprising:
 an optical element generated on a flat substrate; and
 an image forming unit, wherein the optical element is utilized as a substrate for the image forming unit, the image forming unit being adapted to the anatomy of the human eye, and comprising of light-emitting elements formed as separate elements, each having a certain color from a pre-determined color system, or presenting light and dark information, wherein the light and dark information comprises grey values for displaying edge information of objects in the three-dimensional images, and being generated on the back of the optical element and the back of the optical element facing away from a viewer,
 wherein the method is for producing the autostereoscopic display, which is adapted to the anatomy of the human eye, with a plurality of n>2 perspectives for visualization of three-dimensional images for multiple viewers having a 3D impression, said method comprising the steps of:
 providing an optical element comprising a flat substrate, which is characterized by a lens structure;
 determining position parameters of the optical element using a sensor unit, wherein the position parameters define an exact location for the optical element, and wherein the sensor unit comprises,
 a light source and a camera detection device and the light source being configured to illuminate the front of the optical element, and an image of the trans-illuminated optical element being captured on the back of the optical element using the camera detection device, and the captured image being utilized to determine the position parameters of the optical element,
 or wherein the sensor unit comprises a laser sensor, the laser sensor being configured to measure a distance from the laser sensor to the surface of the optical element, and
 the measured distance being utilized to determine the position parameters of the optical element;
 calculating control parameters based on the position parameters of the optical element, wherein the control parameters are utilized to control a generation process for an image forming unit on the surface of the optical element;
 creating an image forming unit, which is adapted to the anatomy of the human eye comprising a plurality of light-emitting elements formed as separate elements each having a certain color from a pre-determinable color system or presenting light/dark information on the back of the optical element, and wherein the back of the optical element faces away from the viewer of the autostereoscopic display; and
 wherein the light/dark information contains grey values display edge information of objects of the three-dimensional images taking into account the control parameters, and
 wherein the image forming unit has light-emitting elements arranged to a pre-determinable layout.

10. The autostereoscopic display according to claim 9, characterized by the light-emitting elements having the same horizontal and vertical size, being in particular square form, the light-emitting elements preferably being used as subpixels.

* * * * *